July 12, 1938. H. A. GROESBECK, JR 2,123,830
MEANS FOR PRODUCING SCREEN NEGATIVES
Filed Dec. 7, 1935 2 Sheets-Sheet 2

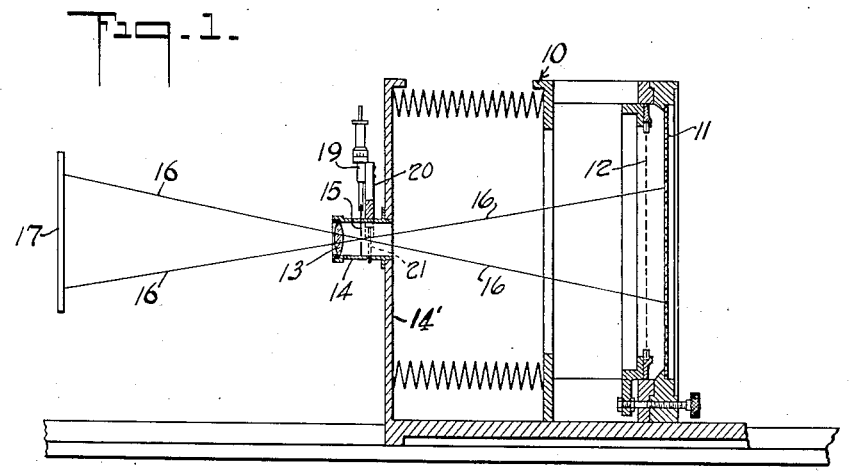

INVENTOR
HARRY A. GROESBECK JR.
BY Henry J. Savage
ATTORNEY

Patented July 12, 1938

2,123,830

UNITED STATES PATENT OFFICE 2,123,830

MEANS FOR PRODUCING SCREEN NEGATIVES

Harry A. Groesbeck, Jr., Chappaqua, N. Y., assignor to Sterling Engraving Company, New York, N. Y., a corporation of New York Application December 7, 1935, Serial No. 53,291

3 Claims. (Cl. 95—64)

My invention relates to photo-mechanical processes and apparatus and particularly to a means for producing improved screen-negatives such as are used in the production of half-tone or photo-lithographic plates and the like.

In the production of half-tone blocks or plates from a photograph, picture or other object, the sensitized plate or film is exposed in the camera with a ruled glass cross-line screen quite close to and in front of it, and the object is photographed through this screen, to produce what is termed a screen negative. This photographic negative of the object being made through the little clear squares of the screen, reproduces the tones of the object, both light and dark, by innumerable dots, the size and proximity of which are governed by the tones of the object and the fineness or coarseness of the screen used. The chief objection to this process is its inability to reproduce fine detail and extremes of expression in black and white. The reproduction of actual white is impossible except by subsequent manipulations and delicate details are destroyed by the cross lines of the screen which tone down all light passages and deprive the half-tone reproduction of the brilliancy and high lights that characterized the original object. True high lights and other tones can be produced only by the addition of hand engraving to touch up the final blocks or plates, but the cost of this "touching-up" is so great as to be prohibitive except in the very finest reproductions.

The quality of the half-tone prints depends primarily upon the shape, fineness and proximity of the dots or lines, the finer the dots, the clearer the detail, as a rule. The number of dots produced per square inch of negative depends of course upon the screen, and screens commonly are used which vary from 50 lines per inch or 2500 openings per square inch to as high as 300 lines per inch or 90,000 squares per square inch. But regardless of how fine the screen, dots always appear on the high lights, and actual white cannot be reproduced, except by hand work or touching up of the negative or printing block, or other supplementary operations.

Heretofore, attempts have been made to increase the number of dots produced through a screen of stated mesh or to wipe out entirely the dots in the high lights by shifting the screen during exposure, this being possible, theoretically, because of the controlled sensitiveness of the emulsion on the photographic plate to lights of varying intensities. But in practice it has not been found satisfactory chiefly because the movements to be given the screen in order to effect proper registry or disregistry (as the case may be) of the dots on the negative are so slight as to be difficult or impossible of accurate control.

The principal object of the present invention therefore is to improve the quality, detail, or tone of half-tone negatives and the like by subjecting the negative to a supplementary exposure or exposures of the light beams passing through the screen after they have been decentralized or displaced from their original position. By thus displacing or decentralizing the light beams after the first exposure, I am enabled to place a second series of dots on the negative in any desired relation to the dots produced by the first exposure. I may therefore increase the number of dots made by a given screen or make them of any shape desired. For example, if I am using a screen having 50 lines per inch or 2500 openings per square inch, and I displace the light beam an amount equal to one-half the distance between lines, the second series of dots will fall exactly between the first series or on those portions of the negative that were covered or protected by the shadows cast by the screen lines during the first exposure, the dots or parts of the negative that were exposed during the first exposure being in turn protected or covered by the screen line shadows during the second exposure, and there will be double the number or 5,000 produced, each of which will be much smaller than the original dots so that the details, lights and tones will be much clearer. The supplementary exposure, of course, is sufficiently short, being determined by the sensitiveness of the plate, so that only the high lights are affected and the dark parts of the object show little or no change on the negative. I attain this by displacing the lens aperture in a plane at right angles to the light beam or parallel to the screen and plate. The effect of this displacement or decentralization of the aperture is to tilt the light beams about the screen as a fulcrum. Since the aperture is a long distance from the screen as compared to the distance of the negative from the screen, varying in some cases from 40 to 1 up to 80 to 1 with the usual cameras, I can very accurately control the decentralization of the light beam and cause it to affect the negative in any desired place with relation to the first, or primary exposure. Also, the diaphragm aperture can be displaced in any direction with respect to the screen, as vertical, horizontal, or at any angle, and by overlapping the exposures, in varying degrees, I can produce many patterns or designs of dots. When the dots formed by the decentralized supplementary exposures are of sufficient size that each covers up the unexposed areas of the original high lights, then they will be completely blocked out in the white areas on the blocks or plates and actual white will be produced.

Many other objects and advantages of the invention will be apparent to those skilled in this art and need not be specifically pointed out, but I claim as my invention all uses and advantages of which the invention is capable.

Referring now to the accompanying drawings wherein I have illustrated one form of apparatus for carrying out the process of the invention and shown by diagram how the light beams may be decentralized for supplementary exposures;

Fig. 1 is a cross sectional view of a conventional camera with means for shifting the lens aperture with respect to the screen and plate;

Fig. 2 is an enlarged view of the lens barrel and aperture-shifting attachment;

Fig. 3 is a sectional view of Fig. 2 taken on the line 3—3 and looking in the direction of the arrows;

Figs. 4 and 5 are diagrams showing how the decentralized rays of light pass through the screen and affect the negative.

Figure 5:
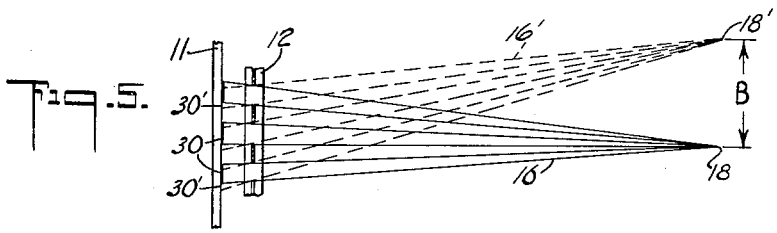

Referring first to Figs. 1 to 3, 10 indicates a camera in which the plate or negative 11 is placed just in the rear of the ruled glass screen 12. The lens 13 is mounted in the lens barrel 14 in which the slide or diaphragm 15, having apertures of fixed diameter, is mounted to slide transversely, the lens barrel being rotatable with respect to the screen angle and camera. Light rays indicated at 16, 16 pass from the object 17 through the lens and aperture 18 in the slide and thence through the clear interstices of the screen 12 to the negative 11. Each clear space on the screen 12 is in effect a lens by means of which the aperture in the slide 15 is photographed onto the plate 11, there being as many negatives made of the aperture in a given area as there are clear spaces or open squares on the screen. If the aperture 18 in the slide be round, then, of course, the reproductions on the plate or film are of the same shape and are spaced, center to center, as determined by the fineness of the screen.

In order to be able to shift the aperture 18 in definite controlled relationship with respect to the screen 12 and negative 11, and place the dots of the supplementary exposures in the exact predetermined places desired on the negative, I have provided the shifter indicated generally at 19 in Fig. 1 and shown in detail in Figs. 2 and 3. This shifter comprises a frame 20 and is secured to the lens barrel by the clamp 21, which holds it rigidly but permits the frame to be rotated with respect to the screen and shift the slide vertically or horizontally or at any intermediate angle. The frame 20 has a guide 22 fixed to its upper end in which the rod 23 is slidably mounted. At its lower end, this rod is slotted and clamped to the diaphragm slide 15 by a screw 24, while at its upper end it is graduated to provide a scale 25, which may be graduated in fractions of an inch or any other lineal standard, but preferably the graduations are equal to the pitch of the screw 26 on the rod, which engages in a knurled nut 27 that is threaded throughout its length. The rod 23 is of reduced diameter at both sides of the screw threads 26 so that it may pass freely through the nut 27. The lower end of the nut 27 is divided into a number of equally spaced graduations 28 and the guide 22 has an index 29 so that the amount of rotation of the nut 27 can be determined. Preferably the scale 25 is located on the rod 23 so that the top line of the scale registers with the top of the nut 27 and the zero graduation of the nut registers with the index 29 when the aperture 18 is centralized. Now if the nut 27 be rotated so as to raise the rod 23 and slide 15, the aperture will be decentralized the same distance that the scale 25 extends above the nut 27. Thus, if the scale 25 be graduated in sixteenths of an inch, the screw 26 be sixteen pitch, and there be eight divisions on the nut 27, the slide will be moved one-sixteenth of an inch for each complete turn of the nut and the displacement of the aperture can be very accurately determined.

Referring now to Fig. 4, 18 indicates the aperture from which the light beams 16 pass through the clear spaces of the screen 12 to the plate or negative 11 whereon they produce spaced images of the aperture at 30. If now the photographic plate be left in the camera and the aperture shifted a distance A to the point 18' for a supplementary exposure, the beams of light 16 will be tilted about the screen 12 as a fulcrum until they occupy their position at 16' and they will produce the images 30' on the plate between the original images 30. This supplementary exposure is relatively short, the interval being determined by the sensitiveness of the emulsion on the plate and the effect that is desired. It will be short enough so that only the strong light from the high lights of the object is effective and the dark shades are not affected. The distance A that the aperture is shifted is determined mathematically from the known distances of the screen 12 from the plate 11 and from the aperture 18, the fineness of the screen and the amount of displacement desired of the dots on the second exposure. When this distance is determined, either by computation or from a prepared table of settings, the graduated nut 27 permits the aperture to be decentralized the exact amount required. In Fig. 4, the aperture has been decentralized a distance so as to place the images or dots 30' exactly between the images 30.

Fig. 5 is similar to Fig. 4, except that the aperture 18 has been shifted to 18' a distance B which shifts the images 30' so that they overlap the images 30 to some extent.

The distance that the apertures are decentralized in the diagrams of Figs. 4 and 5 are greatly exaggerated and out of proportion to actual practice, and are for illustration only. In actual practice, the greatest displacement of the aperture for a camera having a bellows extension of 32 inches will be only about ⅞ inch, and for partial displacement will be correspondingly less.

Figure 6:
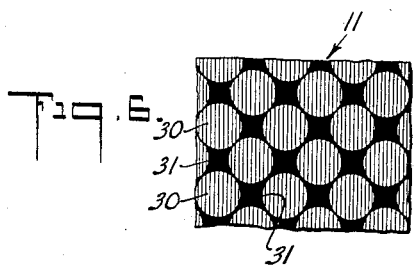
Figs. 6, 7 and 8 show half-tone negatives produced by the usual method of fixed aperture exposures, using an aperture and screen of given dimensions or size.

Fig. 6 shows the images 30 that are produced on the negative by the usual half-tone process, or fixed aperture exposure through a screen by the light from the high lights or white parts of the object. When these are reproduced on the halftone block or plate, the images 30 are the etched out parts and the shaded parts 31 correspond to the dots in the high lights on the final print.

Figure 6A:
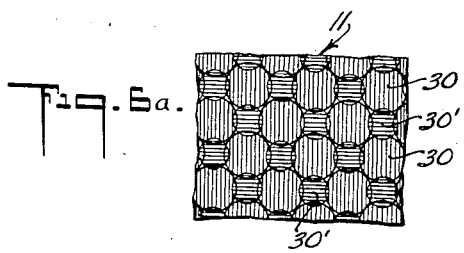
Figs. 6A, 7A and 8A are views of the negative of Figs. 6, 7 and 8 respectively, showing how the high light sections are affected by a supplementary exposure with the aperture shifted.

Now if this negative 11 of Fig. 6 be exposed a second time for a very short interval, with an aperture of proper size and which is decentralized the proper distance, a second set of images 30' can be placed on the plate 11 exactly between the images 30 and completely wipe out the spaces 31 as shown in Fig. 6A. When the printing plate or block is prepared from this double exposure negative, the white parts or high lights are free from dots.

Figure 7:
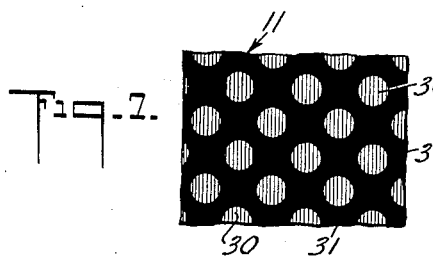
Figure 7A:
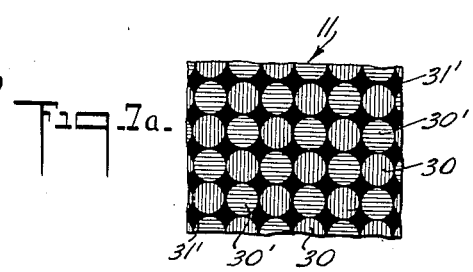

In Figs. 7 and 7A, I have shown how the size of the dots produced by a screen of given fineness may be multiplied in number and decreased in size. This results in much clearer reproduction and fineness of detail and tone which are directly dependent on the fineness and shape of the dots. Fig. 7 shows a plate 11 that has been exposed through a screen to produce the spaced images 30. Fig. 7A shows the same negative after a supplementary exposure with the images 30' placed exactly between the images 30 so that the continuous space 31 between them is divided into a large number of spaces 31' which will produce a like number of dots on the finished print.

Figure 8:
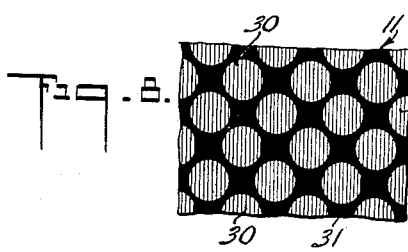
Figure 8A:
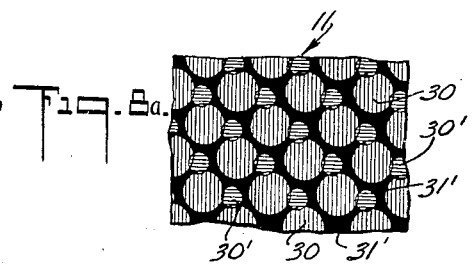

Figs. 8 and 8A show how the continuous space 31 between the images 30 may be transformed into spaced continuous scrolls 31' by using a smaller aperture for the second exposure and decentralizing it angularly with respect to the first exposure so as to produce small images 30' angularly between the images 30, this angular displacement being secured by turning the lens barrel 14 which is rotatably mounted in the front wall 14' of the bellows extension of the camera, as shown in Fig. 1.

Thus by the double exposure of Fig. 6A, I completely blot out the dots from the high lights of the finished half-tone, and in Fig. 7A, I increase the number of high light dots which is essential in bringing out details of the object, and at the same time decrease the total area of all the high light dots without affecting the shadows. In Fig. 8A I illustrate one way in which the form of the half-tone dots may be changed, as well as their value or size.

While I have referred to the screen 12 as a ruled glass screen or half-tone screen, it will be understood that this is but one type of screen that may be used and any reticulated screen adapted for the purpose may be used in place of the ruled glass screen. Also, the supplemental exposure is not limited to one, but in some cases I subject the plate to two, three or even four supplemental exposures, the number varying with the intensity of the light, the character of the object, effect to be produced and other factors.

From the above illustrations, which are but descriptive of the invention and not limitations thereof, it will be apparent that my improved method may be carried out in many other ways and by other apparatus than that herein specifically disclosed, and that by proper selection of screens, aperture sizes and shapes, angular and lateral displacement thereof, and time of exposure, I can produce clear and distinct high lights and bring out details on half-tone prints that heretofore have been impossible except by resort to hand engraving and touching up of printing plates and negatives, and frequently impossible of attainment by any known process, and with coarse screens I can produce much better results than have generally been produced heretofore with much finer screens.

Having thus described my invention, I claim all modifications, adaptations and equivalents thereof that come within the scope of my claims.

What I claim is:

1. In a camera, the combination of a lens barrel having a lens that is co-axial therewith, a slide extending through a slot in the lens barrel and having an aperture of fixed size that normally is centrally located with respect to the common axis of the lens and barrel, a frame supported by the lens barrel, a rod secured to said slide and extending through said frame, an adjusting nut on said frame engaging said rod to move it with respect to the frame and to displace laterally the slide with respect to the axis of the lens, a scale on said nut and rod whereby to measure the lateral displacement of the slide and its aperture with respect to the axis of the lens.

2. In a camera, the combination of a lens barrel having a lens that is co-axial therewith, a slide extending through a slot in the lens barrel and having an aperture of fixed size that normally is centrally located with respect to the common axis of the lens and barrel, a frame supported by the lens barrel, a rod secured to said slide and extending through said frame, an adjusting nut on said frame engaging said rod to move it with respect to the frame and to displace laterally the slide with respect to the axis of the lens, a scale on said nut and rod whereby to measure the lateral displacement of the slide and its aperture with respect to the axis of the lens, and means to displace the slide and aperture angularly with respect to the axis of the lens.

3. In a camera of the type adapted to receive a sensitized plate, a lens barrel having a single lens mounted coaxial therein, a single slide mounted to slide in said barrel and having an aperture that normally is centrally located with respect to the axis of the lens and barrel, a half-tone screen mounted in the camera between the lens and plate, means for moving the slide in the barrel to shift the aperture laterally with respect to the center of the lens and barrel and means for measuring the amount of lateral displacement whereby the image formed through the displaced aperture may be made to fall in a predetermined position with respect to another image formed on a plate previously exposed with the aperture in central position.

HARRY A. GROESBECK.